Aug. 7, 1951 J. D. WOOD ET AL 2,563,441

HIGH-VOLTAGE CELL STRUCTURE

Filed Dec. 20, 1947 14 Sheets-Sheet 1

INVENTORS
Joseph D. Wood
George W. Spicer
BY Ostrolenk & Faber
Attorneys

Aug. 7, 1951 J. D. WOOD ET AL 2,563,441

HIGH-VOLTAGE CELL STRUCTURE

Filed Dec. 20, 1947 14 Sheets-Sheet 2

INVENTORS
Joseph D. Wood
BY George W. Spicer
Ostrolenk & Faber
Attorneys

HIGH-VOLTAGE CELL STRUCTURE

Filed Dec. 20, 1947

INVENTORS
Joseph D. Wood
BY George W. Spicer
Ostrolenk & Faber
Attorneys

INVENTORS
Joseph D. Wood
BY George W. Spicer
Ostrolenk & Faber
Attorneys

INVENTORS
Joseph D. Wood
BY George W. Spicer
Ostrolenk & Faber
Attorneys

HIGH-VOLTAGE CELL STRUCTURE

Filed Dec. 20, 1947 14 Sheets-Sheet 6

INVENTORS
Joseph D. Wood
BY George W. Spicer
Ostrolenk & Faber
Attorneys

INVENTORS
Joseph D. Wood
BY George W. Spicer
Ostrolenk & Faber
Attorneys

Aug. 7, 1951 J. D. WOOD ET AL 2,563,441

HIGH-VOLTAGE CELL STRUCTURE

Filed Dec. 20, 1947 14 Sheets-Sheet 8

INVENTORS
Joseph D. Wood
BY George W. Spicer
Ostrolenk & Faber
Attorneys

Aug. 7, 1951 J. D. WOOD ET AL 2,563,441

HIGH-VOLTAGE CELL STRUCTURE

Filed Dec. 20, 1947 14 Sheets-Sheet 9

INVENTORS
Joseph D. Wood
BY George W. Spicer
Ostrolenk & Faber
Attorneys

INVENTORS
Joseph D. Wood
George W. Spicer
BY Ostrolenk & Faber
Attorneys

Aug. 7, 1951 J. D. WOOD ET AL 2,563,441

HIGH-VOLTAGE CELL STRUCTURE

Filed Dec. 20, 1947 14 Sheets-Sheet 11

INVENTORS
Joseph D. Wood
George W. Spicer
BY Ostrolenk & Faber
Attorneys

HIGH-VOLTAGE CELL STRUCTURE

INVENTORS
Joseph D. Wood
BY George W. Spicer
Ostrolenk & Faber
ATTORNEYS.

INVENTORS
Joseph D. Wood
BY George W. Spicer
Ostrolenk & Faber
ATTORNEYS.

Aug. 7, 1951 J. D. WOOD ET AL 2,563,441

HIGH-VOLTAGE CELL STRUCTURE

Filed Dec. 20, 1947 14 Sheets-Sheet 14

INVENTORS
Joseph D. Wood
BY George W. Spicer
Ostrolenk & Faber
ATTORNEYS.

Patented Aug. 7, 1951

2,563,441

UNITED STATES PATENT OFFICE 2,563,441

HIGH-VOLTAGE CELL STRUCTURE

Joseph D. Wood, Upper Darby, and George W. Spicer, Philadelphia, Pa., assignors to ITE Circuit Breaker Company, Philadelphia, Pa., a corporation of Pennsylvania Application December 20, 1947, Serial No. 792,942

12 Claims. (Cl. 175—298)

Our present invention relates to a switchboard for high voltage circuit breakers and more particularly to a switchboard specifically adapted for use in connection with a high voltage circuit breaker rated at 50,000 kva. interrupting capacity and of the general type described in our application Serial No. 721,648 filed January 11, 1947.

One of the essential elements of the type of circuit breaker disclosed in the aforesaid application is that it is made up of a number of unit assemblies which may readily be selected from standard parts which may be stocked against orders.

The switchboard for the circuit breaker also should be so arranged that the elemental parts thereof may readily be stocked to be assembled for future requirements in accordance with the particular demands of the specific switchboard to be constructed.

Heretofore, in the construction and operation of switchboards of various types including compartments, cells or housings for various kinds of circuit breakers, switchgear, instruments, transformers and other elements which go into the making of the switchboard, it has been necessary to custom build each of the switchboards and to fabricate each of the specific parts thereof from sheets, angles, bars, channels, tubes and other elements.

This has greatly increased the cost of switchboard construction since no stocking of elementary parts has previously been thought possible.

An essential object of our invention is the provision of individual separately manufactured component parts which may readily be assembled into switchboard structures of various types or for the purpose of housing specific types of switchgear permitting a radical departure in the method of fabricating switchboards and making mass production methods possible in contrast to the custom building procedure of the prior art.

Another object of our invention is the arrangement of switchboard structures composed of specific stock parts which may readily be assembled.

Another object of my invention is the arrangement of switchboards so that additional stock parts, compartment cells or other elements may be attached thereto, with provision being made for such future attachment; and even with provision for reassembly of the switchboard elements to form other arrangements after the same have been manufactured, shipped and installed.

Another feature of my invention is the provision of novel racking mechanism in connection with specific readily assemblable and readily rearrangeable switchboard structures, whereby the racking operation for the circuit breaker is accomplished by the operation of one screw and in which the circuit breaker is locked into position by the closing of the front door of the circuit breaker compartment.

The foregoing and many other objects of our invention will become apparent in the following description and drawings in which.

Figure 4B:
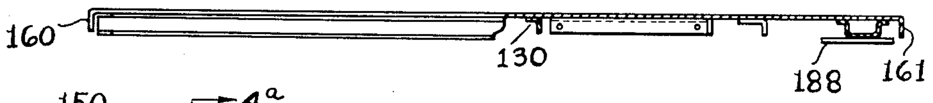
Figure 4 is a side view of the interior portion of a side wall section adapted specifically for the left side of a compartment.
Figures 4, 4A:
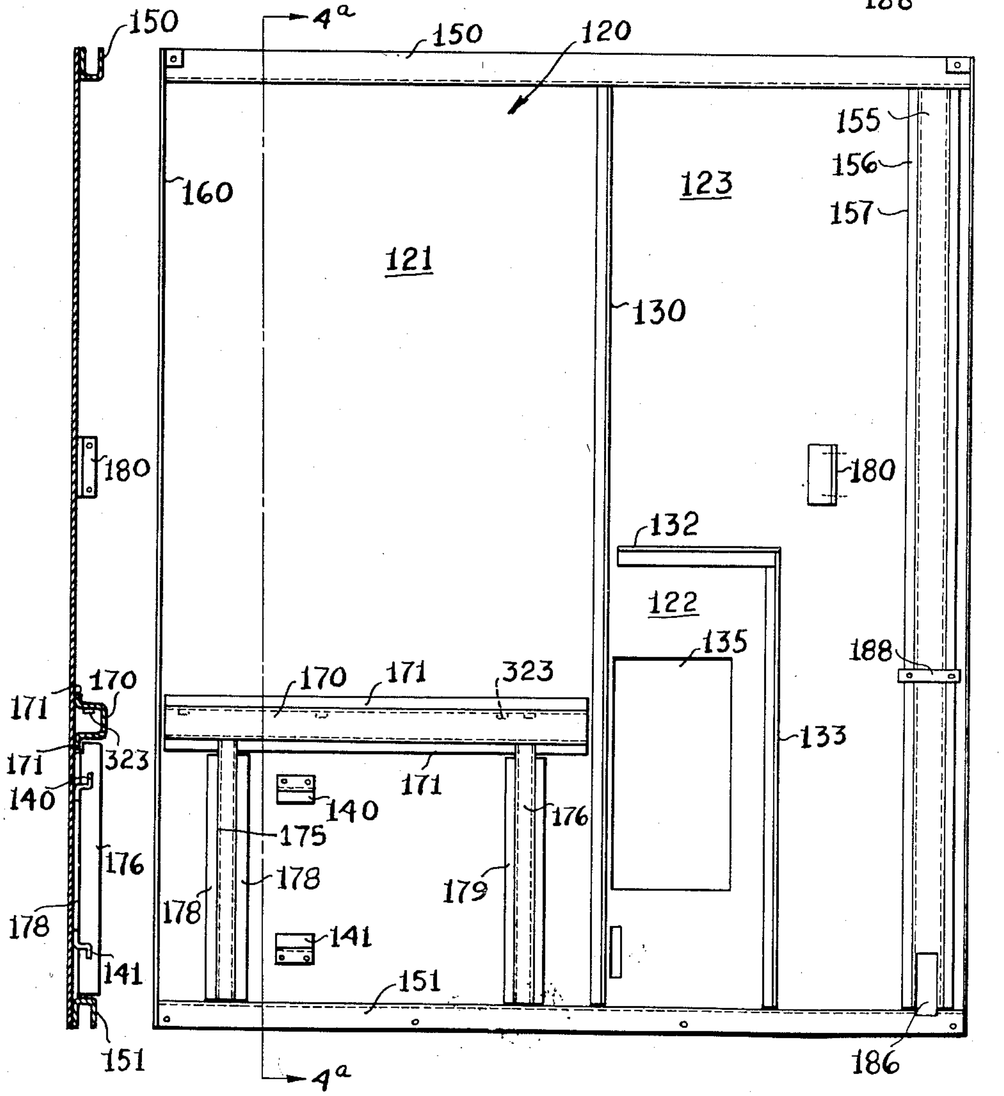

Figure 4*a* is a vertical cross-section taken on line 4*a*, 4*a* of Figure 4 looking in the direction of the arrows.

Figure 4*b* is a top view of the wall section of Figure 4, partially broken away in order to show elements below the top channel section.

Figure 5B:
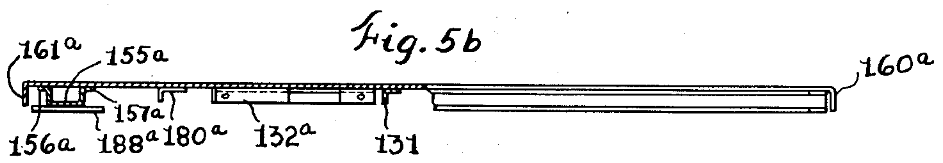
Figure 5:
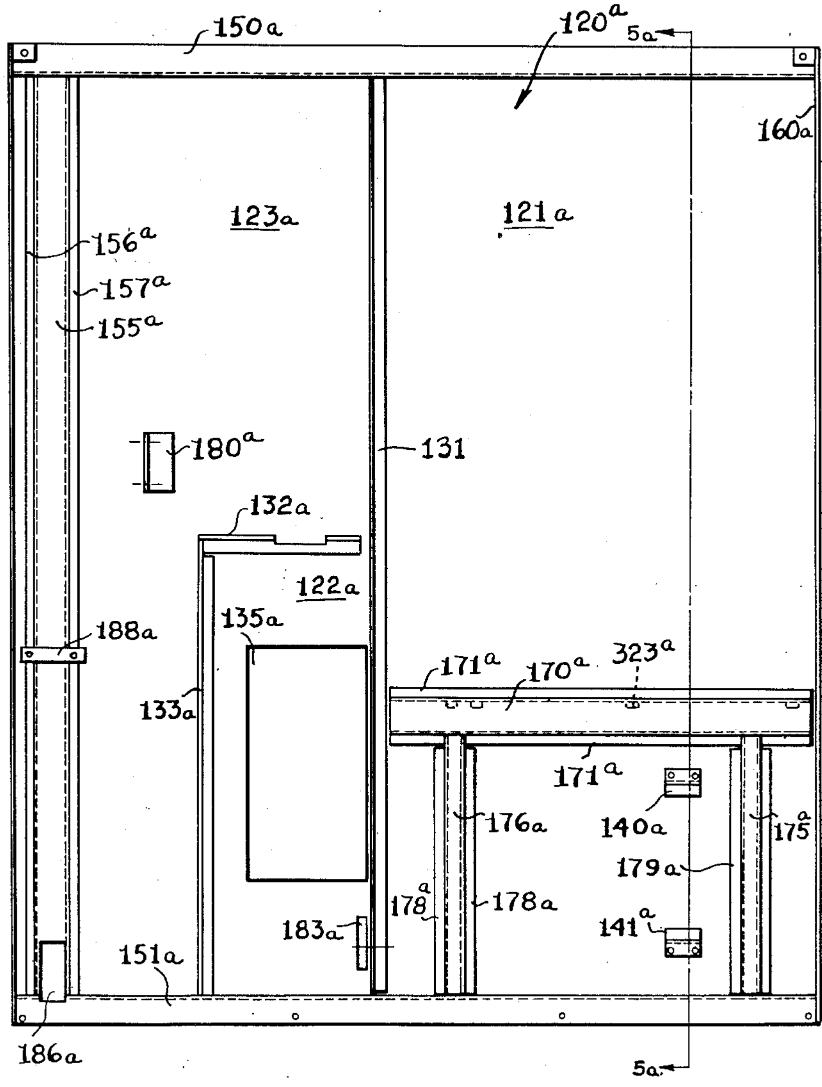

Figure 5 is a side view of the interior side wall of our novel switchboard compartment structure showing a side wall particularly adapted for use on the right side of a compartment.

Figure 5A:
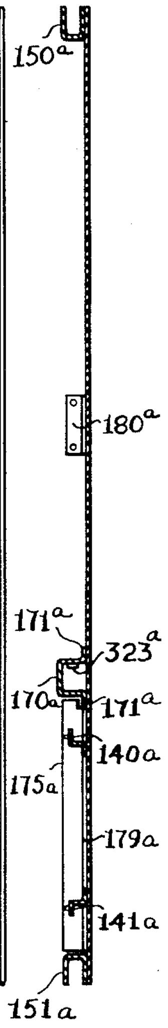

Figure 5*a* is a vertical cross-section taken on line 5*a*, 5*a* of Figure 5 looking in the direction of the arrows.

Figure 5*b* is a top view partially broken away of the wall section of Figure 5.

Figure 6B:
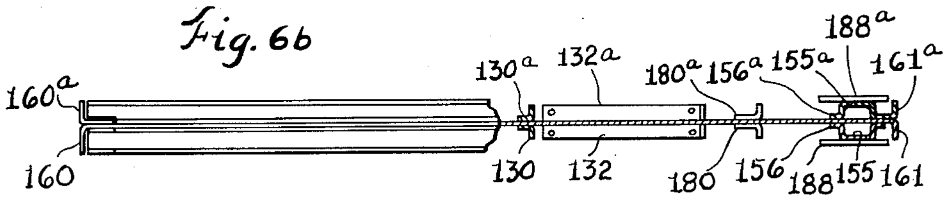
Figures 6, 6A:
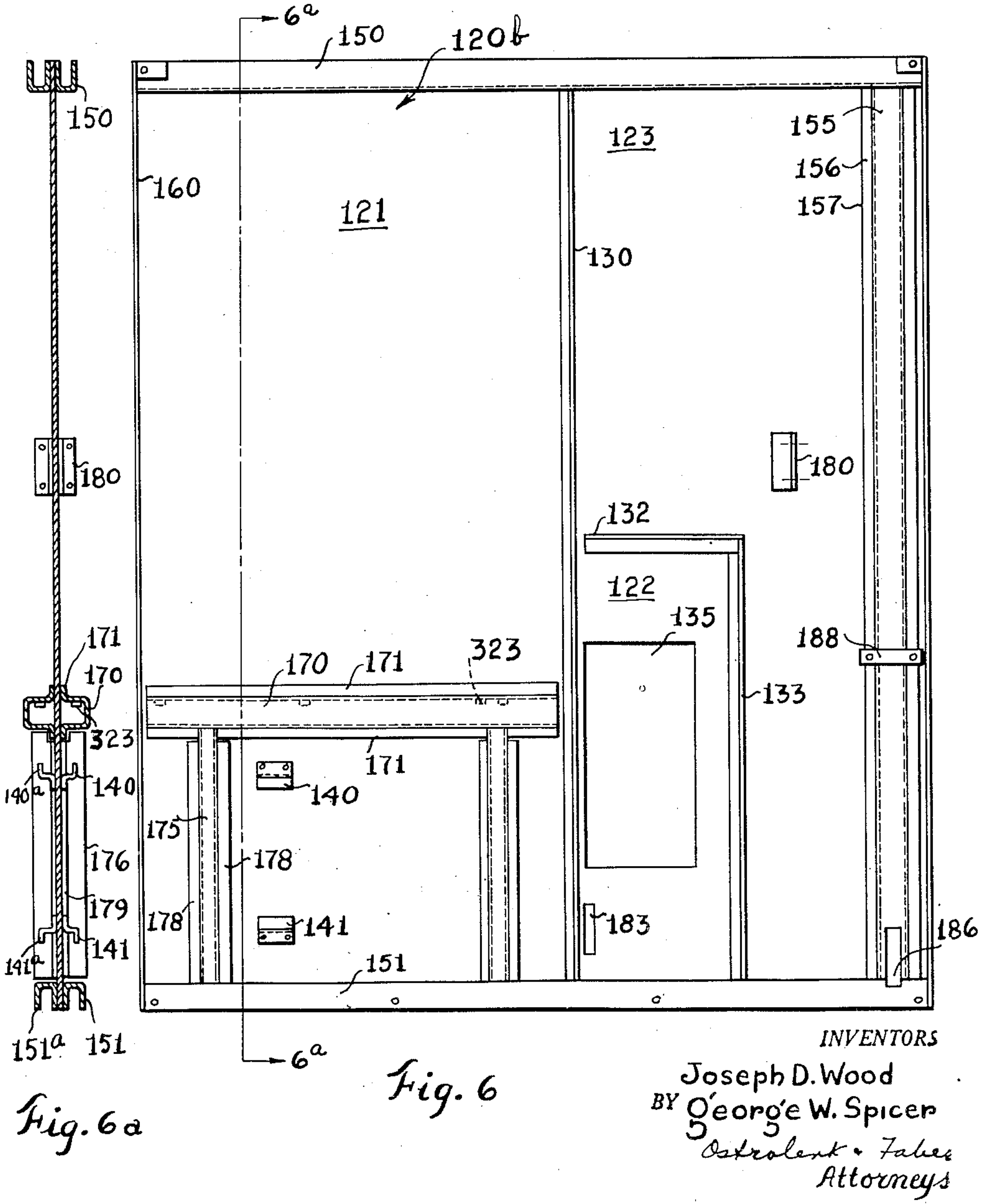

Figure 6 is a side view of an intermediate wall section adapted to be used in place of a right and left wall section between two compartments, being used as a substitute for two combined wall sections of Figures 4 and 5.

Figure 6*a* is a cross-sectional view taken on line 6*a*, 6*a* of Figure 6 looking in the direction of the arrows.

Figure 6*b* is a top view partially broken away of the intermediate wall section of Figure 6.

Figures 7, 8:
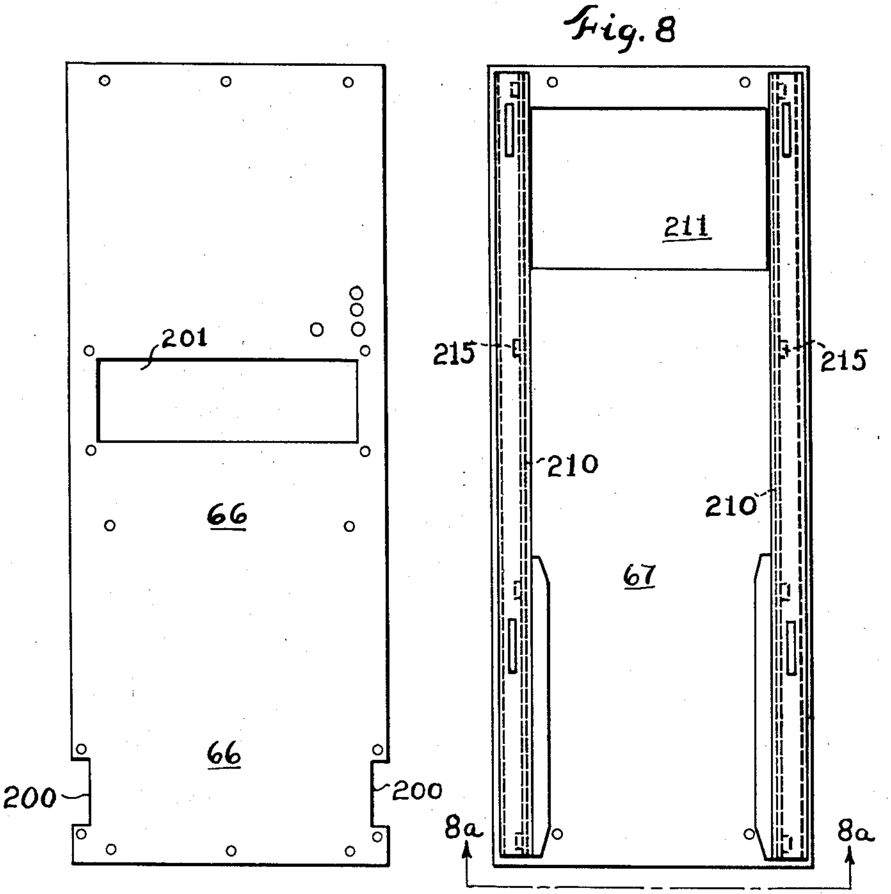

Figure 7 is a plan view of the top piece or cover of one of the enclosures.

Figure 8 is a plan view of the bottom plate of one of the enclosures.

Figure 8A:
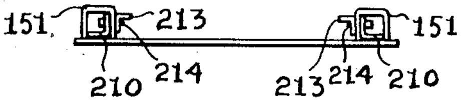

Figure 8*a* is a front end view of the bottom wall section of Figure 8.

Figures 9, 9A, 10, 10A, 11, 11A:
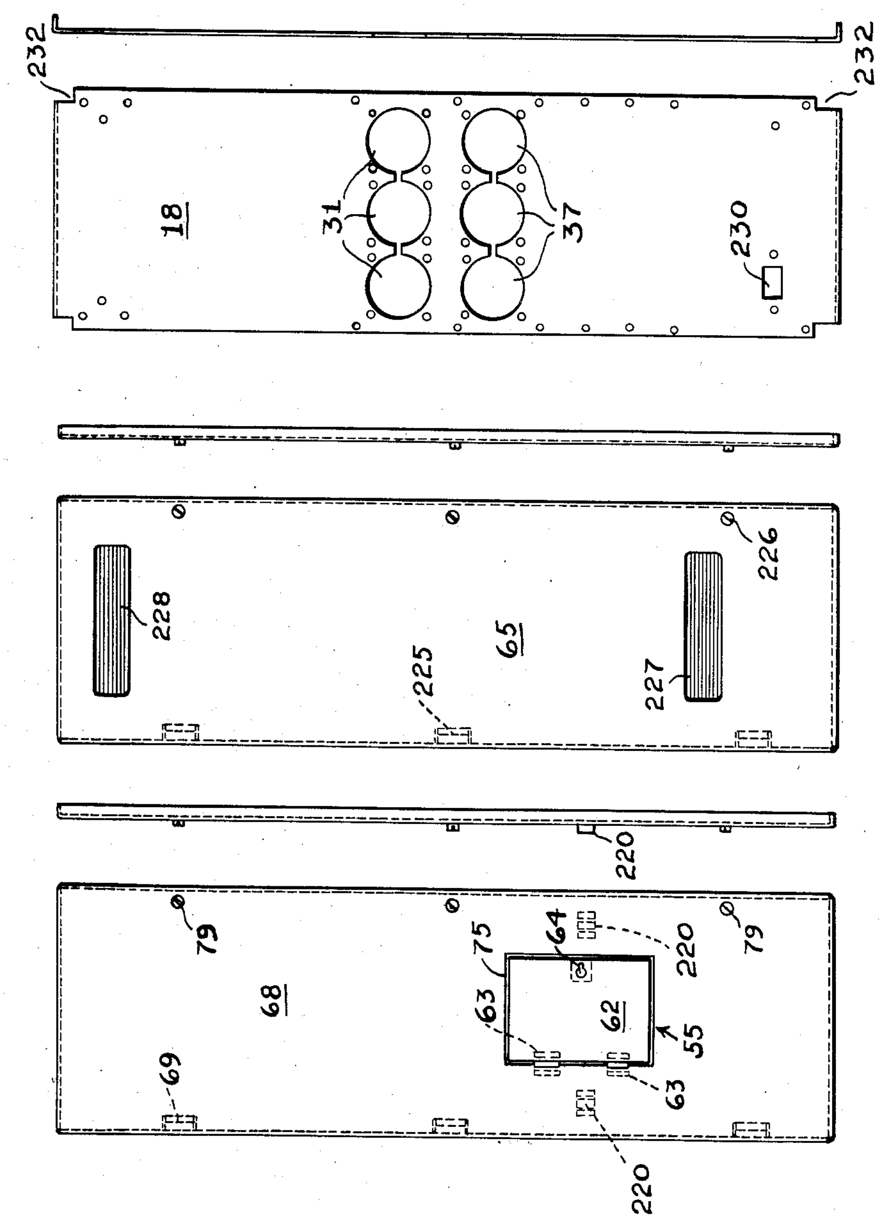

Figure 9 is a front elevation of the front door.

Figure 9*a* is an end view of the door of Figure 9.

Figure 10 is a rear elevation of the back cover of the enclosure.

Figure 10*a* is an end view of the back figure of Figure 10.

Figure 11 is an elevation of the isolation plate which divides the enclosure into the breaker compartment and the bus compartment.

Figure 11*a* is an end view of the isolation plate of Figure 11.

Figure 12:
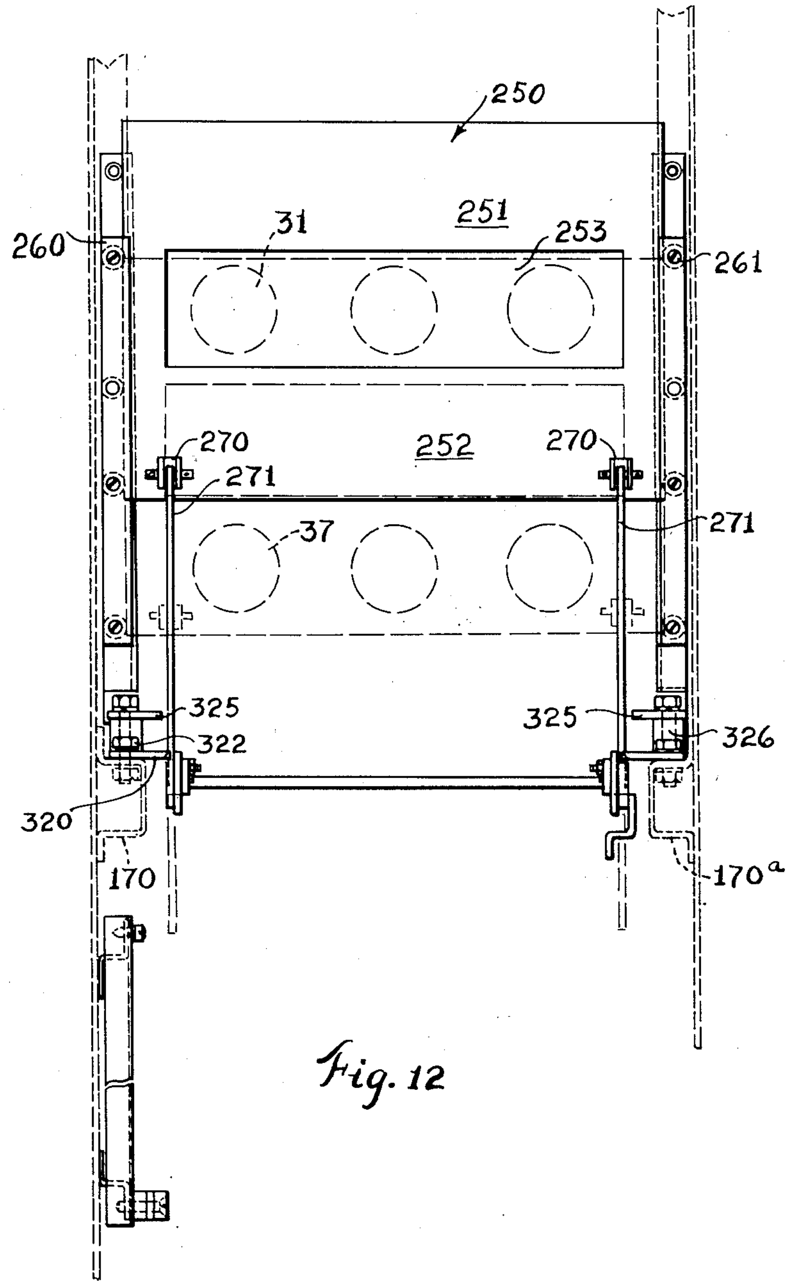

Figure 12 is a front view of the shutter assembly including the shutter which slides vertically in front of the isolation plate of Figure 11 and showing also the breaker guide track with part of the sides of the enclosure shown in phantom. The shutter is shown in the open or operative position and indicated in phantom in the closed or inoperative position.

Figure 13:
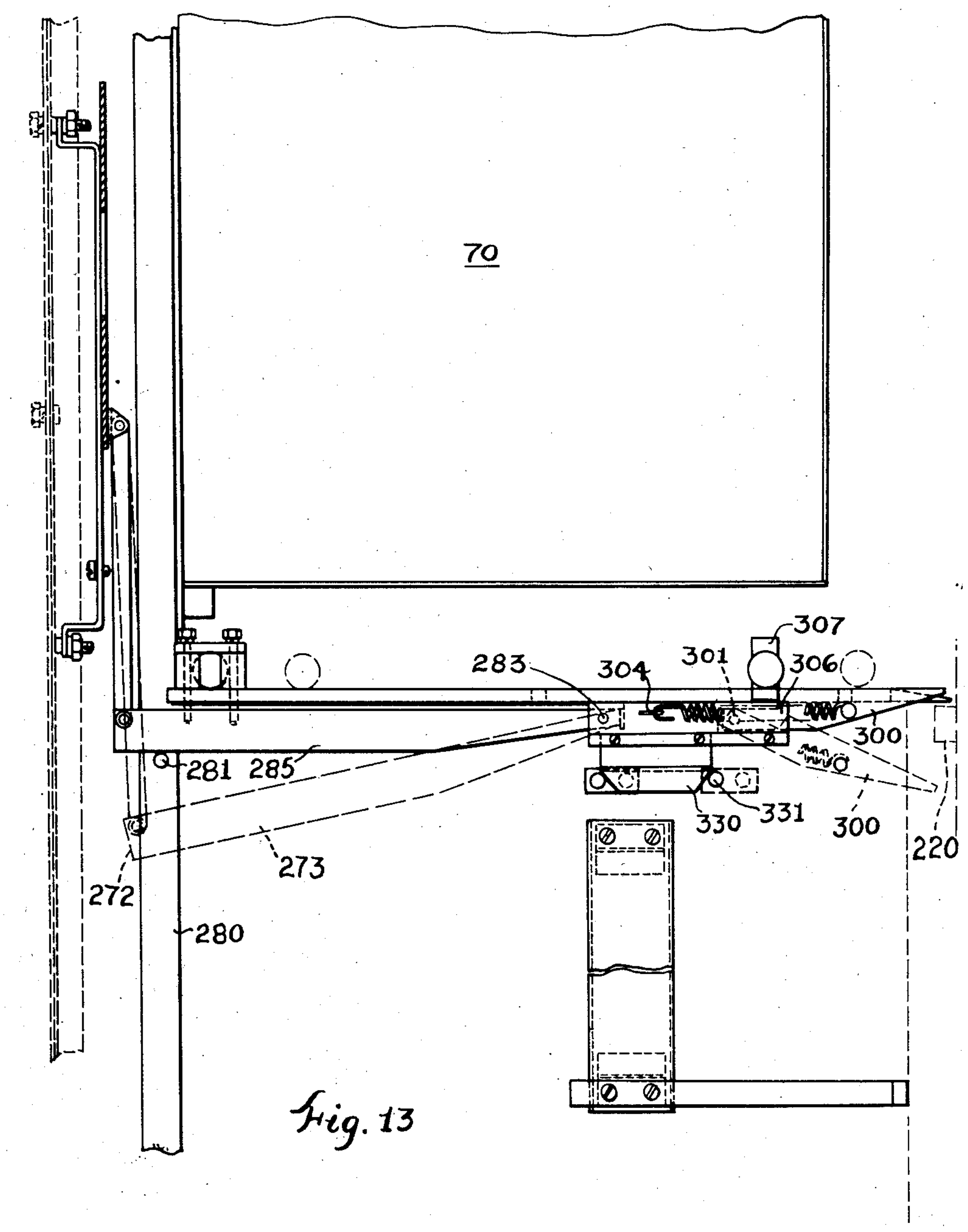

Figure 13 is a side view taken just within the left side wall of the compartment showing the shutter assembly in the operative position of the circuit breaker and the circuit breaker in position within the compartment and showing also in dotted lines the position which the compartment elements assume when the circuit breaker is withdrawn.

Figure 14:
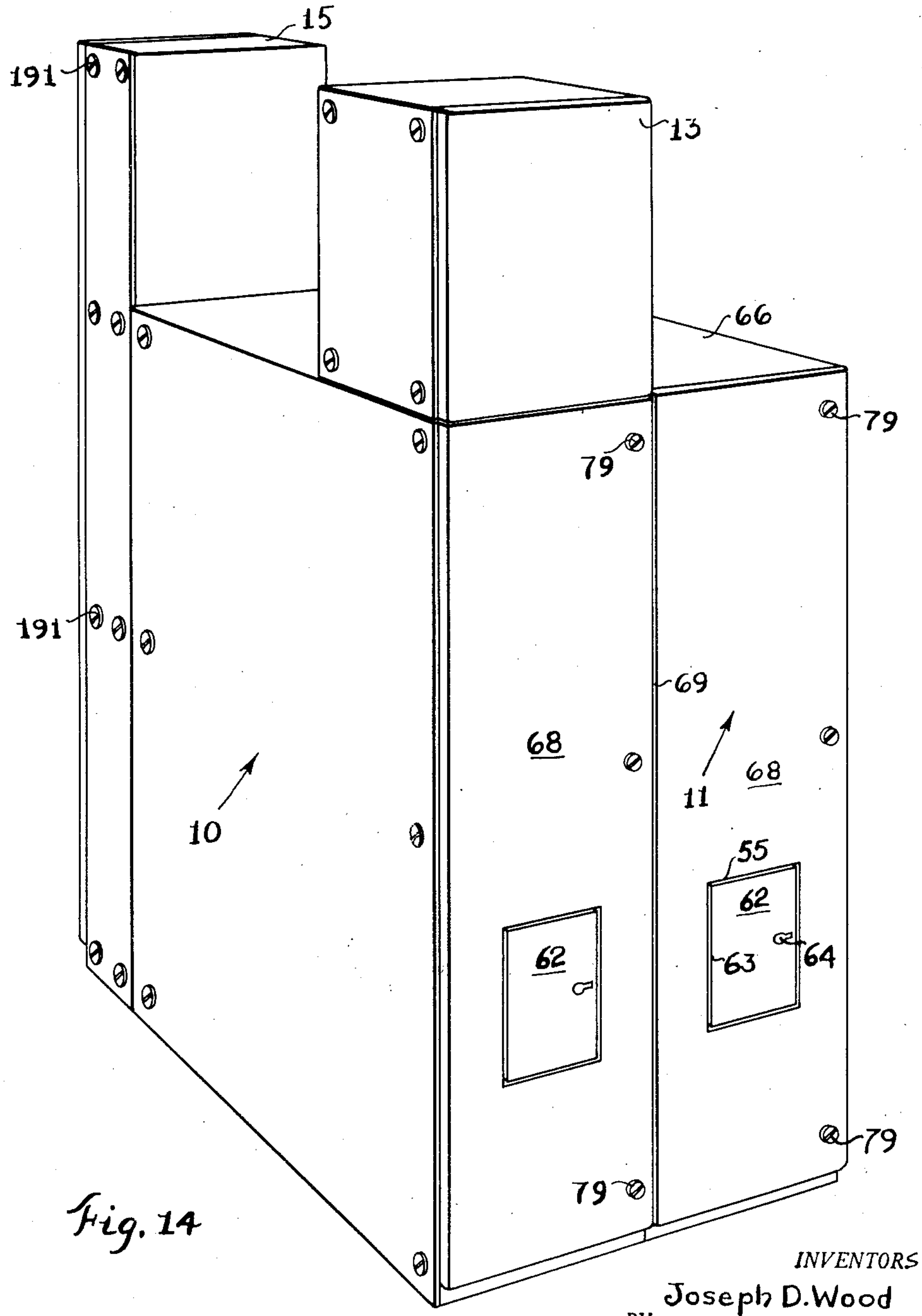

Figure 14 is a view in perspective of an assembly of several enclosures according to my invention showing the method of attaching supplementary compartments for various accessories.

Figure 15:
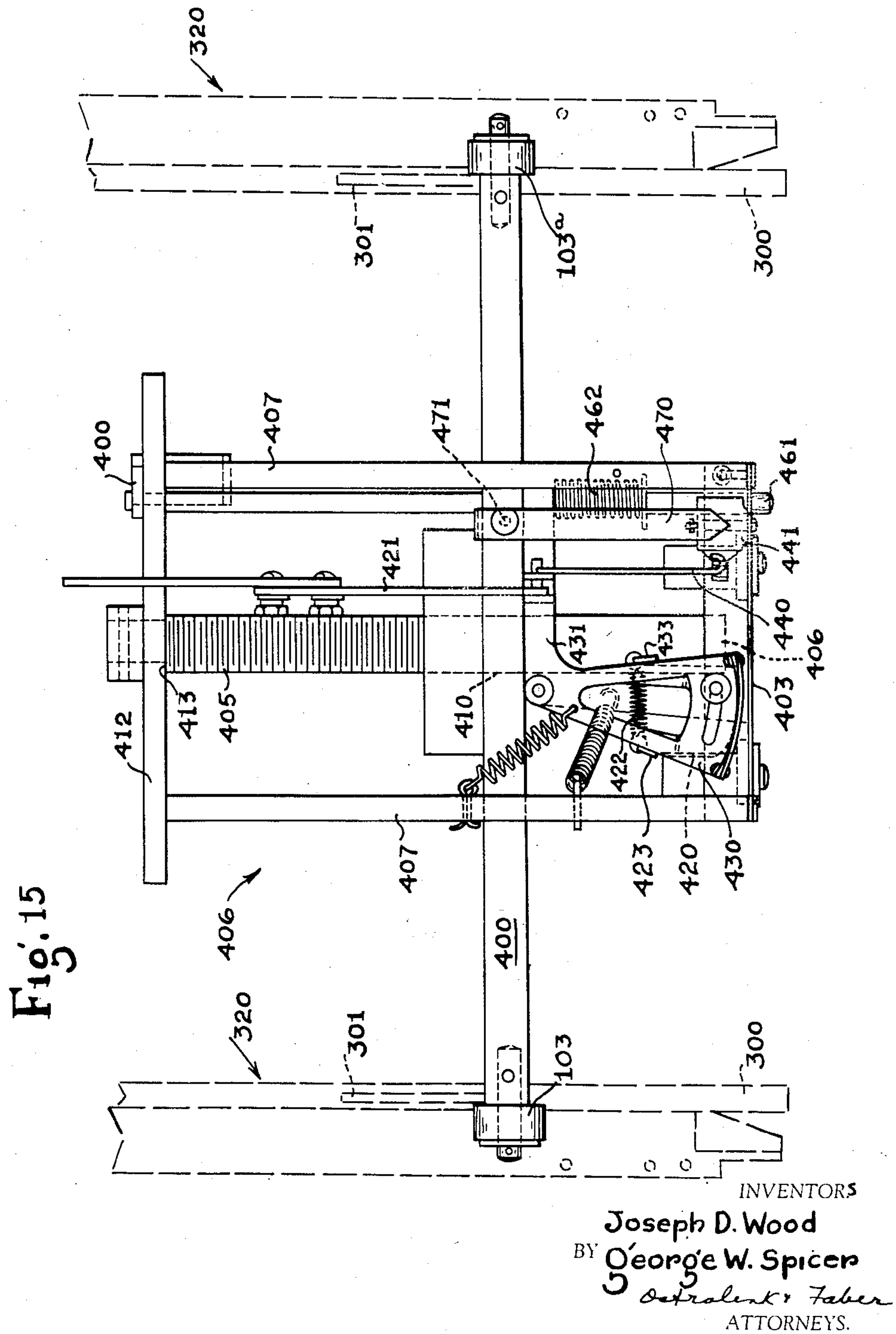

Figure 15 is a plan view of the racking and indicating mechanism of our novel circuit breaker and shows the sides of the enclosure in phantom.

Figure 16:
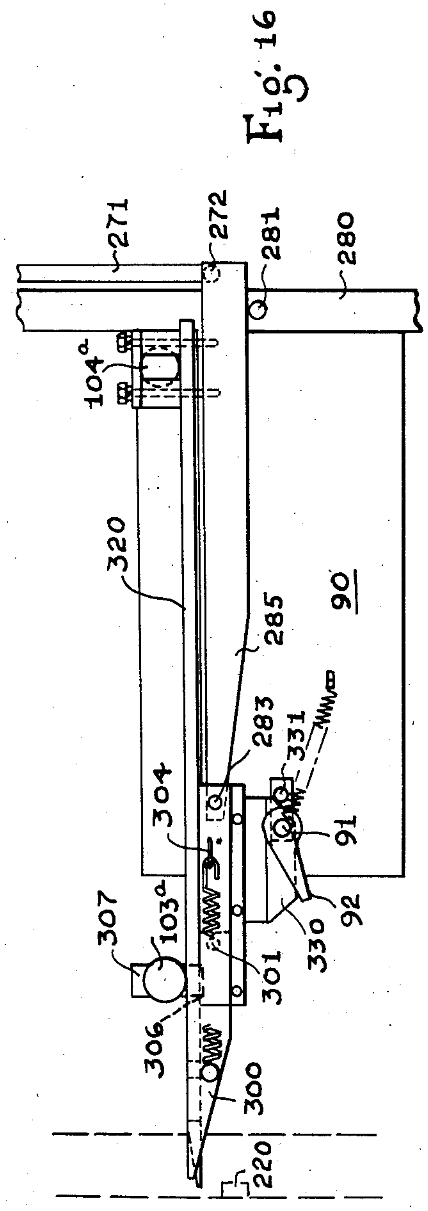

Figure 16 is a schematic right side view of the operating mechanism of the circuit breaker and the guide track on which it runs showing the various interlocking and safety features.

Figure 17:
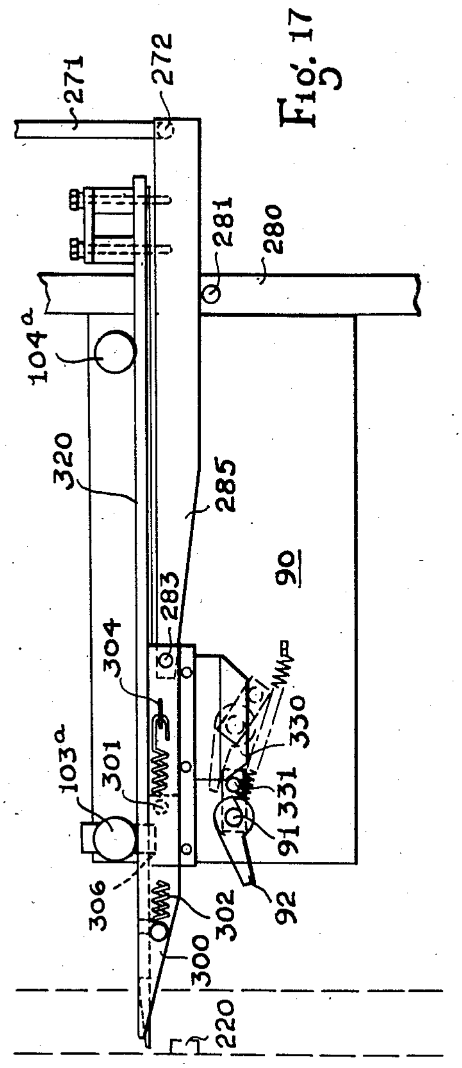

Figure 17 is similar to Figure 16 but shows the relation of the circuit breaker to the enclosure in the test position.

Figures 18, 19:
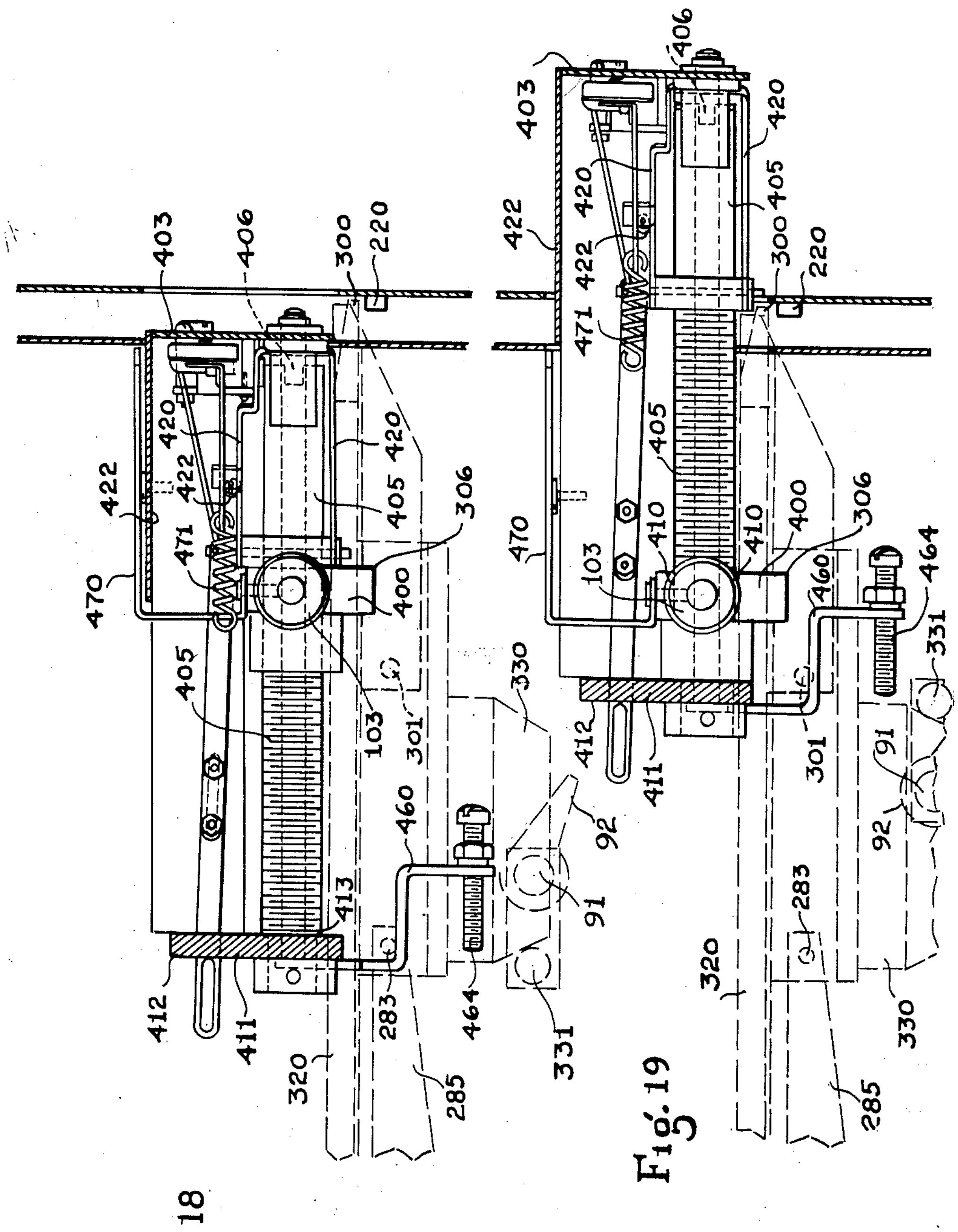

Figure 18 is a left side view of the indicating mechanism of our novel circuit breaker showing the track and racking members in phantom.

Figure 19 is a similar view to Figure 18 except that the indicating mechanism is shown in the test position.

Figure 1:
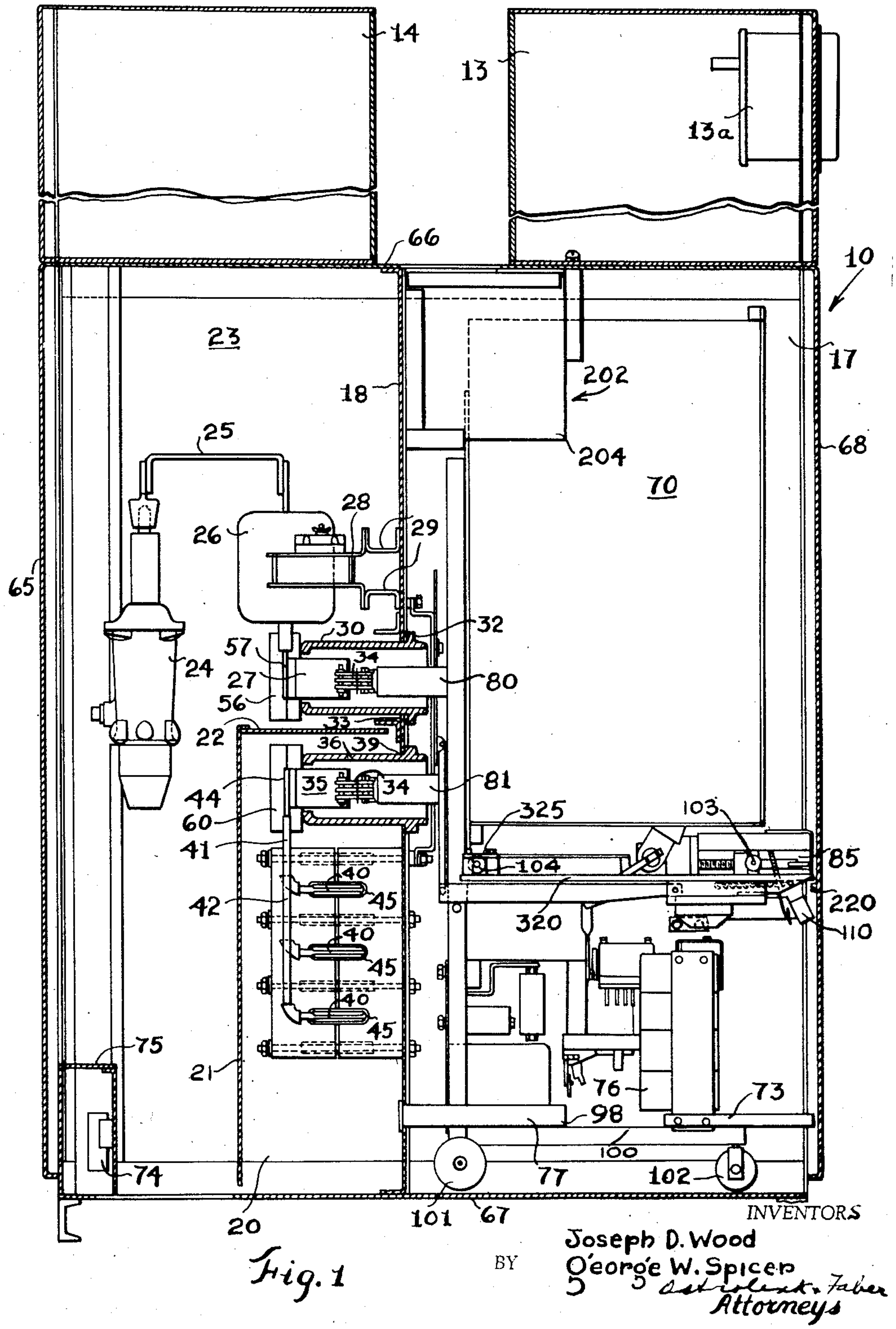
Figure 1 is a cross-sectional view taken vertically front to back through a compartment or enclosure in our novel switchboard showing the circuit breaker in the operating position.
Figure 2:
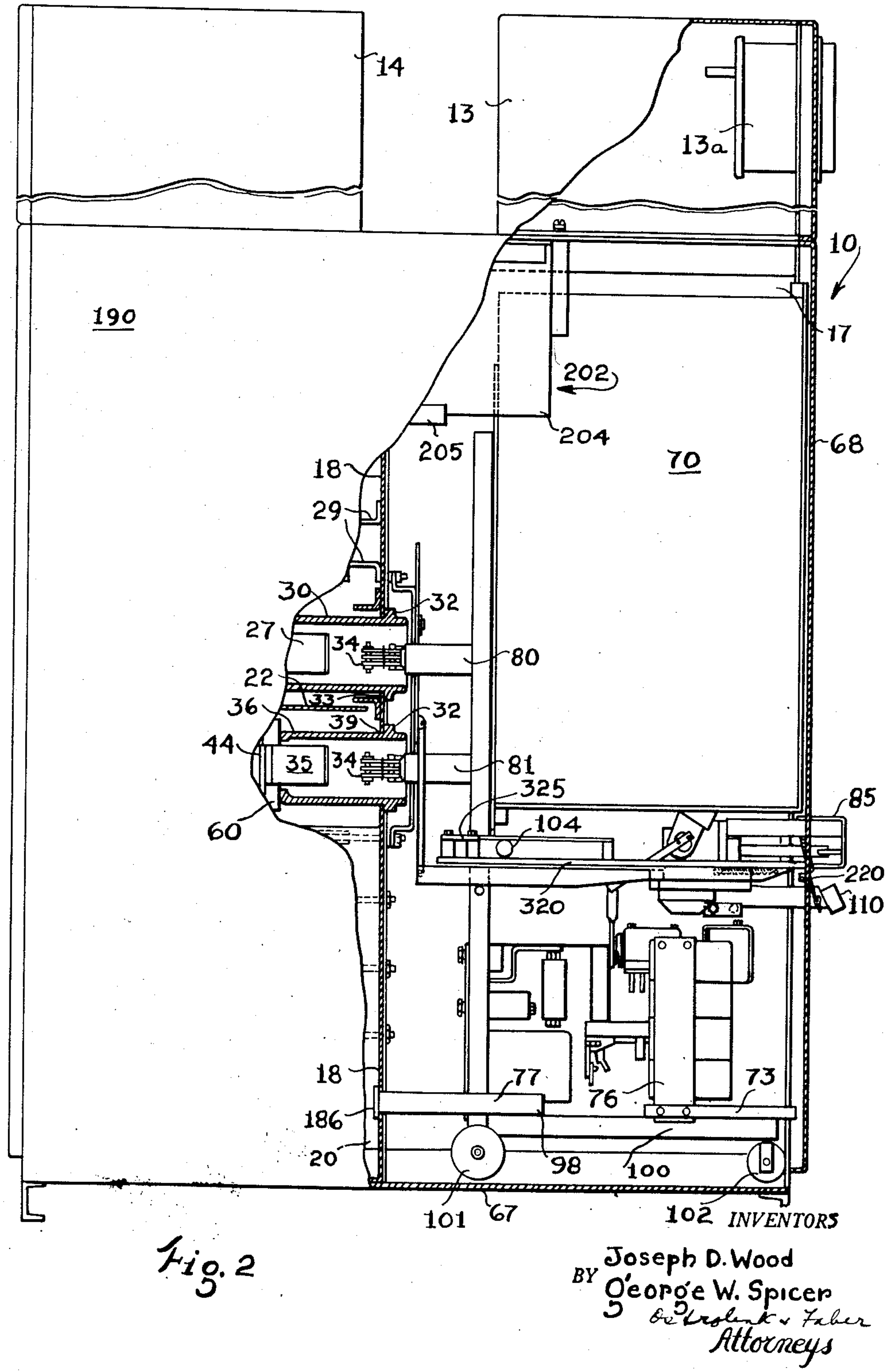
Figure 2 is a view corresponding to that of Figure 1 showing a circuit breaker in the test position.
Figure 3:
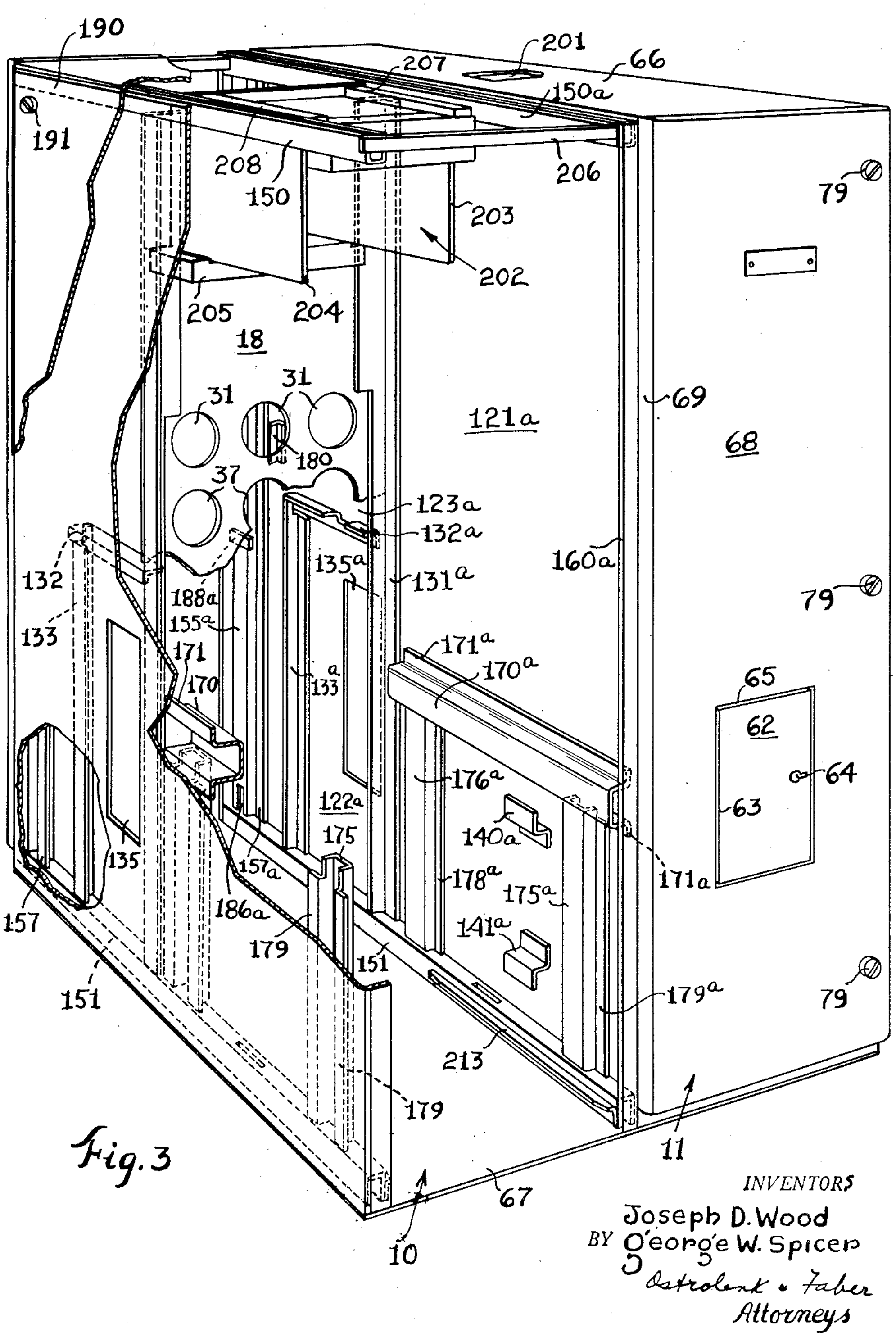
Figure 3 is a view in perspective of an end of our novel switchboard with one of the enclosures partially broken away in order to show the various members which are welded to the side sheets.

Referring first to Figures 1, 2, 3 and 14, our novel switchboard may comprise a number of circuit breaker enclosures represented by the two enclosures 10 and 11 of Figures 3 and 14 and additional compartments such as compartments 13 and 14 of Figures 1 and 2 or compartments 13 and 15 of Figure 14. Compartments 13, 14 and 15 as hereinafter described may provide housings for instruments of various kinds and other auxiliary elements essential to the operation of the switchboard.

In Figures 1 and 2 we have shown side views of the interior of the compartment 10 and in Figure 3 we have shown a broken away view in perspective of the interior of compartment 10.

Essentially, each of the individual enclosures for specific circuit breakers of the high voltage type of the general character described in the application Serial No. 721,648, filed January 11, 1947, comprises a multiplicity of specific enclosures each for a specific purpose: Thus the compartment 10 comprises a circuit breaker enclosure 17 at the front extending the full vertical height and width of the entire enclosure 10, and extending back up to the isolation plate 18, which extends from the top to bottom of the enclosure 10. Behind the lower portion of the isolation plate 18 is located the load bus compartment 20 which is enclosed by the vertical metal sheet 21 and the horizontal metal sheet 22 which extend between the side walls of the compartment as hereinafter described. The remainer of the enclosure comprises additional compartment 23 at the rear of the entire enclosure which may contain the pot head 24 for distribution of the incoming current to individual buses 25 which lead to individual current transformers 26 to the individual stationary back disconnect contacts 27. The current transformer 26 also in compartment 23 is secured to the upper rear end of the isolation plate 18 in any suitable manner as, for instance, by the current transformer mounting feet 28 which in turn are bolted to the U-shaped channel brackets 29, 29 welded to the rear of the isolation plate 18.

The upper stationary disconnect contacts 27, usually three in number, are mounted within insulating tubes 30 secured in any suitable manner in opening 31, 31 of isolation plate 18. The tubes 30 are provided with a front flange 32 preferably integral with the material of the insulating tube 30 which positions the front of the insulating tube 30 accurately within the openings 31. The insulating tubes 30 are captured in the openings 31 of the isolation plate 18 by a securing ring 33 mounted over the insulating tube 30 and secured in any suitable manner to the rear surface of the isolation plate 18. The lower stationary disconnect contacts 35 which match in number the upper stationary disconnect contacts 27 and are located immediately below the upper stationary disconnect contacts 27 are also mounted in insulating tubes 36 which are positioned in openings 37, 37 of the isolation plate 18 and which are held against the isolation plate 18 by the integral flange 38 and the securing ring 39 at the front and back, respectively, of the isolation plate 18.

The main buses 40, 40 for each of the individual disconnects 35 are connected to their specific disconnect contacts by the jumper buses 41 which are covered by pre-molded slip-on tubings 42. A molded insulation bus cover 60 is provided between the lower disconnect contacts 35 and the individual jumper buses 41. The main buses 40 in the compartment 20 are also provided with slip-on insulating tubing 45.

The utilization of pre-molded slip-on insulating tubes obviates the necessity for covering buses 40 and 41 during manufacture; nor need specific lengths of such buses be sent out or otherwise specially treated in order to provide the specific insulation required.

An essential element of the construction of our novel switchboard is the ability to construct the switchboard from readily available parts which may be stored. Accordingly, the individual main bus 40 and the individual jumper buses 41 are provided and stored without insulation and the individual insulating tubings 45 and 42 may be separately stored. When the switchboard is constructed and the individual compartments laid out the main bus 40 and jumper buses 41 are cut to size and then the tubing 45 for the main bus 40 and tubing 42 for the jumper buses 41 are cut to appropriate size so that they may be simply slipped over the individual bus elements which they are to protect. In order to prevent the effects of corona discharge or other surface phenomena which may result from irregularities in the bus surface, the interior of the molded insulation tubing which is slipped on over the buses is provided with a conductive or semi-conductive surface and the cross-sectional area of the molded insulation is so arranged that the conductive or semi-conductive surface will be pressed into fairly tight engagement with the particular bus. As long as an efficient contact is made at least at some points between the interior of the molded insulation and the bus itself, defects or phenomena which would result from the utilization of the simple molded insulation without any conductive surface are obviated and the effects of corona discharge phenomena are thus obviated.

Molded insulation bus joint covers 60, 56 are placed over the connections or joints between the disconnect contacts 27 and the current transformer connection extension 57. These are similar to the molded insulation cover 60 placed over the connection between lower disconnect contact 35 and jumper bus 41.

The compartment 10, in addition to the side walls hereinafter described, includes a top wall 66, a bottom wall 67, and a front wall 68 which preferably consists of a door hinged on the left side 69 and held in place in the closed position in any suitable manner as for instance by the panel screws 79. Each front panel or door 68 is also provided with a small panel or door 62 preferably hingedly secured to the main door 68 along the left side at 63 and held closed by a lock 64. Door 62 closes the opening 63 through which control elements hereinafter described for moving the circuit breaker between the operative and the test position are accessible when the door 62 is open without requiring the opening of the entire front panel or door 68.

A safety feature is thus provided since all of the control elements both for racking the circuit breaker in and out and for testing the circuit breaker are accessible through the door 62 of the main front door or panel 68. Keeping the main front door panel 68 closed while racking the circuit breaker in or out or while testing it provides an efficient protection for the operator in case any fault or unintended current is present within the compartment during any portion of the racking in or out or testing procedure.

The circuit breaker 70 is provided with a plurality of elements as described in the heretofore mentioned application Serial No. 721,648 filed January 11, 1947, and as above-described may be provided with control contact shown as contact 71 in the above identified application which may contact with the stationary control contacts 76 both in the fully operative and in the test position of circuit breaker. The stationary control contacts 76 on the side of the compartment are connected in a suitable manner as by a cable to the terminal blocks 74 for outgoing control circuits which terminal blocks 74 are located within the enclosing steel cover 75 at the rear bottom of the rear compartment 23. Suitable wiring connections are made through troughs along the side walls which are herein described.

The circuit breaker 70 is also provided with a grounding contact (not shown) which engages the grounding connection 77 which is in turn supported by the isolating barrier 18. The ground connection 77 is sufficiently long so that the circuit breaker 70 is completely grounded in every position of the breaker within the front compartment 17 until the circuit breaker 70 is to be fully withdrawn and has been moved outward beyond the test position for withdrawal purposes.

The circuit breaker 70 is provided with upper disconnect contacts 80 and lower disconnect contacts 81. The upper disconnect contacts 80 enter the upper tubes 30 to engage the stationary disconnect contacts 27 and the lower disconnect contact 31 entering the tubes 36 to engage the lower disconnect contacts 35. The disconnect contact 34, 34 elements may have the general construction shown in application Serial No. 721,648 assigned to the owner of the present invention but may have any suitable disconnect structure.

The circuit breaker 70 is also provided with racking mechanism at 85 which is intended to cooperate with complementary racking mechanism in the front compartment 17. This racking mechanism is of the type described in application Serial No. 721,648.

The base 100 of the circuit breaker is provided with three wheels 101, 101, 102 for riding in appropriate guides at the bottom of the compartment 17; the circuit breaker 70 is also provided with intermediate side wheels 103, 103*a* for riding on the intermediate tracks described specifically in connection with Figures 4, 5, and 6.

In Figure 2 the circuit breaker 70 has been shown racked out to the test position with the disconnect contacts 80 and 81 of the circuit breaker 70 disconnected, respectively, from the stationary disconnect contacts 27 and 35 in the compartment. The control contacts 71 of the circuit breaker are in engagement with the stationary control contacts 76 in the interior of the circuit breaker compartment and the grounding contact 77 of the circuit breaker is still in engagement with the grounding bus 78 in the compartment.

With the control contacts 76 engaged various control aspects of the circuit breaker may be tested while nevertheless no current is passing through the main contacts 80, 81 of the circuit breaker owing to the fact that the main disconnect contacts 34, 34 have been separated. Of course, it is necessary to unlock the lock 64 and open the small panel of door 62 covering the opening 55 in order that the rack-out mechanism 85 and the closing handle member 110 of the circuit breaker might be accessible through or actually extend outside of the front panel 68 for operation of the circuit breaker and the rack-out mechanism. In the test position the closing handle member 110 extends outside of the front panel 68 and the small panel or door 62 in opening 55 opens sufficiently to permit full operation of the handle 110 in order to test the circuit breaker 70 properly.

The various wall and track arrangements shown and indicated in Figures 1, 2, and 3 will become clearer from an examination of Figure 4 which shows a wall for the left side of a compartment when the compartment is faced from the front; Figure 5 which shows an almost identical wall for the right side of the compartment and Figure 6 which shows an intermediate wall which combines all the aspects of Figures 4 and 5 for a left-right wall or intermediate wall to be used between two compartments when a multiplicity of compartments are used.

Referring first specifically to Figure 4, the left side wall 120 is divided essentially into three sections. Section 121 is the front vertical half of the wall which defines the left side of enclosure 17 of the entire compartment 10. Section 122 of the wall is the portion of the wall which defines enclosure 20 of the compartment 10. Section 123 of the wall is the section which defines enclosure 23 of the main compartment.

As previously pointed out, enclosure 17 defined in part by portion 121 of side wall 120 is for the circuit breaker. Enclosure 23 is defined in part by section 123 of the side wall in which the pot head 24, current transformer 26 and upper stationary disconnect contact assembly are mounted. Enclosure 20 defined in part by portion 122 of the side wall of Figure 4 is the portion in which the lower disconnect contact assembly and bus assembly are housed.

The vertical isolation plate 18 of Figures 1, 2 and 3 is supported between opposite side walls of Figures 4 and 5 by the vertical brackets 130 of Figure 4, the left-hand side wall and 131 of Figure 5 the right-hand side wall. The other section 121a, 122a, and 123a of the right-hand side wall of Figure 5 correspond to the similarly numbered sections of Figure 4 already described and cooperate with these sections in order to define the enclosures of the compartment above-mentioned.

The transverse housing members 21 and 22 which define the lower disconnect compartment 20 are supported between brackets or flanges 132, 133 of the left-hand side wall of Figure 4 and the similar flanges or brackets 132a, 133a of the right-hand side wall of Figure 5. The two side walls and the panels or sheets 22 and 21 thus form the complete enclosure for the lower disconnect contact assembly and the main buses assembly.

Side wall sections 122 and 122a of the left-hand and right-hand side walls 120 and 120a, respectively (Figures 4 and 5) are provided with the rectangular openings 135 and 135a in order to provide a passageway for the main bus runs and their supports from one compartment or enclosure to the next.

The entire side wall sections 120, 120a are preferably made of a single sheet to which the various brackets, channels and troughs are welded or secured in any suitably manner.

The stationary control contact members 76 at the lower portion of the circuit breaker compartment 17 are supported in any suitable manner from the side walls as by the brackets and flanges 140 and 141 of the left-side wall 120 of Figure 4 and 140a and 141a of the lower front end of the right side wall 120a of Figure 5.

The side sheets or walls 120, 120a of Figures 4 and 5 are each provided with a top channel member 150 and 150a, respectively, which members each act as an upper stiffening piece. Members 150, 150a also act as troughs for any wires which may be required for control or other purposes or for actuation or connection to instruments; and the elements 150, 150a also act as a support for the top plate 66 hereinafter more specifically described in connection with Figure 7.

Similar trough like channel members of inverted U-shape cross-section 151 and 151a are provided for the bottom edge of the side walls 120, 120a for Figures 4 and 5. These members also act as stiffening pieces; as pointed out in connection with the upper members of similar conformation they may act as troughs for control or other wiring connections for various elements of the circuit breaker or instruments or attachments connected thereto; and they also act as a brace which facilitates the securement of the side pieces to the bottom wall 67 of Figure 8.

The back end of each of the walls 120 and 120a of Figures 4 and 5 is stiffened by the vertical channel members 155 and 155a, respectively, having the outwardly extending flanges 156, 157 for the side wall 120 of Figure 4 and 156a and 157a for the side wall 120a of Figure 5; the said flanges being welded or otherwise secured in any suitable manner to the side walls 120, 120a.

These members act not only as stiffening pieces where required but also act as a trough for control wires or connections to various elements of the switchboard.

The front of each of the walls 120 and 120a is further stiffened by the re-entrant flange 160 for wall 120 of Figure 4 and 160a for wall 120a of Figure 5 and the back of each of the walls is similarly stiffened by re-entrant flanges 161 of Figure 4 and 161a of Figure 5. The flanges 160 and 160a also serve as an appropriate support for the front panel or door 68.

The horizontal flange channel members 170 and 170a are provided, respectively, for side walls 120 and 120a in the lower sections 121, 121a, respectively, of these side walls. These channel members are provided, respectively, with flanges 171, 171 and 171a, 171a by means of which the channels 170, 170a are welded or secured in any other suitable manner to the side walls. The channels 170, 170a act as stiffening pieces for the side walls as well as troughs through which wires or other connections may be made to various elements of the switchboard; the channels 170, 170a are, however, especially provided in this location to act as a support for tracks which carry wheels 103 and 104 of the circuit breaker in order to support the circuit breaker in the compartment. The track members, hereinafter described, which are supported by the channels 170, 170a are so arranged that when the circuit breaker is in the compartment the wheels 103 and 104 riding on the said tracks cause the lower wheels 101, 102 to lift from the bottom floor 67 of the compartment.

The smaller vertical channels 175 and 176 for side wall 120 of Figure 4 and 175a and 176a for side wall 120a of Figure 5 are secured in any suitable manner as by spot welding the flanges 178, 179, 178a, 179a thereof to the said side walls. These channels 175, 176 extend between the horizontal channels 170 which support the tracks and the lower horizontal channel 151 at the base of the side wall and act as a stiffening means for further rigidifying track 170 in order to assist in the support of the circuit breaker 70 which rides on a track supported by the channel 170.

Each of the side walls is also provided with the bracket member 180 secured in any suitable manner, as, for instance, by welding and which provides a support for the pot head 24. Each of the side members is also provided with an opening 183, 183a, respectively, for the side walls 120, 120a of Figures 4 and 5 in order to provide a passage for the grounding bus (not shown).

The lower ends of channels 155 and 155a of Figures 4 and 5 are each provided with an opening 186, 186a, respectively, in order to provide for means of entry of control or other connecting wires which may pass through the channels 155 and 155a. Strap 188 across the vertical channel members 155, 155a is provided for rigidity. The side wall members 120, 120a of Figures 4 and 5, respectively, are preferably used at the end or as the end walls of any switchboard.

The walls are provided with the openings shown and described so that additional sections may be added where required. But in order to give the outer side walls of the switchboard a finished appearance and to exclude dust from any of the openings which do not have to be utilized, a finishing piece consisting of a flat sheet 190, seen in Figure 3, is provided which may be secured in any suitable manner as by the screws 191 over the outside of the side wall 120 or 120a of Figures 4 and 5, respectively.

Where an additional enclosure is later to be added to the particular side wall, then the sheet 190 is removed; an additional side wall member of the form of Figures 4 or 5, as the case may be, is secured in any suitable manner against the existing side wall member with the openings aligned and the additional compartment is added.

Where, however, a multiplicity of compartments are constructed simultaneously for a particular switchboard, then in order to obviate the necessity for individual right and left hand wall for the intermediate walls between two compartments, my invention contemplates the provision of a special intermediate wall member 120b of Figure 6.

The intermediate wall member 120b of Figure 6 has all of the elements previously described in connection with Figures 4 and 5, one side of the intermediate wall 120b carrying the elements shown in Figure 4, and the other side carrying identical elements, the said elements being arranged as shown in Figure 5. The reference numbers previously applicable to Figure 4 have been applied to the view of Figure 6 since the elements shown in Figure 6 are the left hand wall elements identical in form and arrangement with the elements of Figure 4. The right hand wall elements visible in Figures 6a and 6b have been given the reference numbers already applied to Figure 5 since these right hand wall elements are identical in every respect with the wall elements shown in Figure 5.

The utilization of such an intermediate wall member 120b such as shown in Figure 6 thus reduces the number of walls; and, in a switchboard consisting of a large number of compartments arranged adjacent to each other, cuts down the cost of material and assembly appreciably.

The wall members of Figures 4, 5, and 6 are so arranged that they may be readily stocked and assembled in connection with the other wall elements of Figures 7, 8, 9, 10 and 11 hereinafter described.

All of the wall elements, including the wall elements of Figures 7 to 11 as well as the wall elements already described are so contructed that they comprise flat or relatively flat sheets which may be stored without consumption of any unnecessary space and, in fact, occupy little more space than that which would be required for flat sheet stock which heretofore was used to custom build or form each of the circuit breaker or other switchboards when an order was received.

By this means, therefore, great economy in operation is achieved because mass production methods are permitted and assembly operation may be made from stock rather than by hand operations from individually formed sheets.

The circuit breaker enclosure is provided with a top plate 66 (Figure 7) having recesses 200 on each side in order to provide clearance for the vertical channels 155, 155a of Figure 4 and 5. The top plate 66 is also provided with the opening 201 registering with the chimney 202 above the arc chute. Chimney 202 is more particularly shown in Figure 3 and comprises a pair of insulating side plates 203, 204 supported on an insulating cross piece 205 carried at the front upper end of the isolating plate 18. The insulating side plates 203, 204 are interbraced by the insulated cross bar 206 and are also supported by the upper bracing bars 207, 208 which extend between the isolating barrier 18 and the insulating cross bar 206. The chimney 202 which registers with opening 201 is a passage located above a portion of the arc chute of the circuit breaker 70 providing an escape path for the arc gases formed during circuit interruption. The arc chute with which the arcing chimney 202 cooperates is described in the above-mentioned application Serial No. 721,648 filed January 11, 1947.

In Figure 8 we have shown a plan view of the bottom wall 67 of the compartment. Bottom wall 67 is provided with a side guide 210 secured hereto in any suitable manner for receiving the wheels 101 of the circuit breaker truck when they are inserted into the circuit breaker compartment.

Opening 211 is provided in order to provide access for the incoming cables or distribution bus network. Additional guide members 213 for the wheels 101 may be provided in order accurately to position these wheels, the said guide 213 (Figure 3) being secured in any suitable manner as by welding or otherwise to the lower re-enforcing elements 151, 151a of the compartment.

In Figures 9 and 9a are shown a front view of the front door panel 68 including the hinges 69 which facilitates attachment and the screws 79 which secure the door closed. We have also shown in detail the smaller door 62 for opening 55 to provide access to the racking and manual operating elements of the circuit breaker, showing also the hinges 63 securing the hinged panel or small door 62 on the main door 68 of the lock 64. The front door or panel 68 of Figure 9 also carries a stationary latching element 220 on the interior thereof (see also Figures 1, 2, and 13).

The function of this stationary latching element which is in position whenever the door 68 is closed will be described in connection with the specific operating elements of the compartment and also in connection with the description of Figures 12 and 13.

In Figures 10 and 10a are shown rear and end views, respectively, of the back panel 65, which may also be hingedly secured in any suitable manner to the back of the compartment by means of hinges 225 secured to flanges of the compartment and locked in place by the securing means including the bolts 226. The back panel 65 is provided with bottom louvres 227 and top louvres 228 to provide for ventilation of the compartment 23.

In Figures 11 and 11a we have shown elevation and end views, respectively, of the isolating panel or barrier 18 having the openings 31, 31 for the upper disconnect elements and the openings 37, 37 for the lower disconnect elements. The lower portion of the isolating barrier 18 is provided with an opening 230 for the ground connections 98 leading to the grounding bus (not shown) (Figure 1). The isolating barrier 18 is provided with recesses 232, 232 at the corners in order to clear the channel elements 150, 151 on each of the side walls.

In Figure 12, we have shown a front view looking into the front of the compartment with the circuit breaker 70 removed from the compartment and showing specifically the safety shutter back panel 250 (Figure 13) pins 281 on each side of the circuit breaker 70 which ride against the under side of the bar 273 in the stationary cubicle. Bar 273 is pivotally connected at its front by the pin 283 carried by the side wall of the compartment so that bar 273 may rotate up and down between the solid and dotted line position of Figure 13.

When the circuit breaker truck is in position in the compartment as shown in Figure 13, then pin 281 supports the bar 273 in the up position, thus pushing the safety shutter 250 to the up position where openings 31 and 37 in the isolating barrier 18 are accessible. As the truck 70 is withdrawn the pins 281 riding beneath the arms 273 continue to support the same even past the test position until the circuit breaker truck is approximately half withdrawn from the compartment. At this time, the pins 281 pass beneath the chamfered surface 285 of the arms 273 on each side permitting the arms 173 to drop down to the dotted line position of Figure 13; both arms rotate about their pivots 283. This permits the links 271 to drop down thereby permitting the isolating barrier to drop so that section 251 of the isolating barrier 250 covers the aligned openings 31 and section 252 of the isolating barrier 250 covers the aligned openings 37. A mechanical shut off mechanism for the openings is thereby provided to isolate the disconnect contacts 27 and 35 which would otherwise be accessible.

The racking member hereinafter specifically described in connection with Figures 15 to 19 is provided with a latch member 300 on each side pivotally mounted at 301 on the side wall. The latch member 300 on each side is provided with an over-center tension spring 302 connected between pin 303 on one side of the pivot 301 on the latch member 300 and the lug 304 secured to the compartment wall on the other side of the pivot 301. The tension spring 302 is thus an over-center spring which will maintain the latch 300 in the upper latching position shown by the solid lines of Figure 13 or in a down unlatched position shown by the dotted lines in Figure 13. The latch member 300 is provided with a latching detent 306 which engages the cross bar 307 of the racking mechanism to prevent accidental displacement of the circuit breaker outwardly within the compartment as long as the latch member 300 is in the upward position. Latch member 300 is maintained in the upper position by the safety latch 220 on the inside of the front door 68. When the door is closed, safety latch 220 is positioned under the latch member 300 to prevent the latch member 300 from accidentally dropping down and thereby releasing the cross bar 307; this prevents accidental removal of the cross bar 307 toward the front end of the compartment and bars movement of the circuit breaker 70 toward the front of the compartment except when the latch 300 is released intentionally by the operator.

As seen in Figure 12 as well as in Figure 1, the horizontal channel members 170 on each side carry a track member 320 secured thereto by bolts 322 which pass through the nuts 323 welded inside the channel 170. The track members provide an appropriate guide or track from the intermediate wheels 103 and 104 on each side. An additional retaining flange or ledge 325 is provided on each side at the interior end of the track members 320 secured to the reinforcing member 170, 170*a* by the bolts 326. The rear wheel 103 on each side of the circuit breaker truck 70 moves in under the retaining flange 325. This acts to prevent vertical upward displacement owing to circuit interrupting conditions within the circuit breaker 70 itself and ensures that the circuit breaker will remain stationary during interruption of severe overcurrents.

It will be noted from Figure 15 that the bar 400 supports the guide wheels 103—103*a* which in turn ride on the guide tracks 320—320. When the breaker has been rolled into the enclosure as far as shown in Figure 17 and Figure 2, the bar 400 is captured in the detent 306 of the latch member 300. This prevents further movement of the breaker in either direction except by turning the racking screw 405 which is accomplished by inserting a crank in the front end of the racking screw at 406.

Since the bar 400 is held stationary by the latch member 300 rotation of the racking screw 405 in the clockwise direction will cause the breaker to move into the connected position due to the pressure of the shoulder 413 of the racking screw 405 against the cross member 412.

As the mechanism is racked into position the pin 331 cooperates with the interlocking trip cam 330 and rotates the tripper bar extension 92 to the trip position thus opening the circuit breaker and assuring that the breaker cannot be racked into the operative position with the circuit breaker contacts closed. The reverse of this condition exists when the circuit breaker 70 is racked out. As soon as the racking out operation is started pin 331 cooperates with interlocking tripper cam 330 and trips the circuit breaker 70 before the disconnect contacts 34—34 have separated (Figure 2).

Further elements of the racking mechanism correspond to the device shown and described in application Serial No. 721,648 filed June 11, 1947.

Our invention makes possible:

1. Use of individual assemblies.
2. Utilization of mass production methods.
3. Utilization of parts which may readily be stored in a flat condition.
4. The arrangement of a circuit breaker switchboard so that elements of parts may be readily added thereto.
5. Arrangement of enclosed switchboard for 50,000 and 100,000 kva. breakers.
6. Arrangements of switchboards so that not only additional structures may be added to include additional circuit breaker but also so that transformers and instrument casings may be added conveniently.

In the foregoing, we have described our invention solely in connection with specific illustrative embodiments thereof. Since many variations and modifications of our invention will now be obvious to those skilled in the art, we prefer to be bound not by the specific disclosures herein contained but only by the appended claims.

We claim:

1. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof.

2. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof, certain of said reinforcing ribs acting as ducts for carrying control wiring for the circuit breakers.

3. In a switchboard structure consisting solely of substantially flat wall members for the top, bottom, sides and back and partition walls, predetermined ones of said wall members having reinforcing ribs secured thereto and forming brackets for securing its associated wall member to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells, and having said ribs symmetrically located on both surfaces thereof.

4. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof, certain of said reinforcing ribs acting as ducts for carrying control wiring for the circuit breakers, and means for interconnecting the individual complete wall members in a multiplicity of combinations to form a plurality of compartments arranged in a plurality of combinations.

5. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof, certain of said reinforcing ribs acting as ducts for carrying control wiring for the circuit breakers, said switchboard being adapted to be stored and shipped with its wall members in knock-down condition.

6. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof, certain of said reinforcing ribs acting as ducts for carrying control wiring for the circuit breakers, said switchboard being adapted to be stored and shipped with its wall members in knock-down condition, and said partition walls forming a rear compartment comprising a bus housing, the front compartment thereof forming a housing for the circuit breaker.

7. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof, certain of said reinforcing ribs acting as ducts for carrying control wiring for the circuit breakers, said switchboard being adapted to be stored and shipped with its wall members in knock-down condition, and said partition walls forming a rear compartment comprising a bus housing, the front compartment thereof forming a housing for the circuit breaker, and openings in said partition walls through which electrical connections between the compartments are made.

8. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof, certain of said reinforcing ribs acting as ducts for carrying control wiring for the circuit breakers, said switchboard being adapted to be stored and shipped with its wall members in knock-down condition, and said partition walls forming a rear compartment comprising a bus housing, the front compartment thereof forming a housing for the circuit breaker, and openings in said partition walls through which electrical connections between the compartments are made, and means for closing said openings when no connection is made therethrough.

9. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjcent cells and having said ribs symmetrically located on both surfaces thereof, certain of said reinforcing ribs acting as ducts for carrying control wiring for the circuit breakers, said switchboard being adapted to be stored and shipped with its wall members in knock-down condition, and said partition walls forming a rear compartment comprising a bus housing, the front compartment thereof forming a housing for the circuit breaker, and openings in said partition walls through which electrical connections between the compartments are made, and means for closing said openings when no connection is made therethrough, said means being operable on movement of said circuit breaker into and out of its compartment.

10. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof, certain of said reinforcing ribs acting as ducts for carrying control wiring for the circuit breakers, said partition walls forming rear compartments for the bus housing, the front compartments forming housings for the circuit breakers and alignable openings in the side wall members for a bus run.

11. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof, said front wall having an opening and a panel covering said opening, said panel being operable to provide access to the circuit breaker in the compartment enclosed therein.

12. In a switchboard structure composed entirely of substantially flat members forming the top, bottom, sides, back and partition walls, predetermined ones of said walls having reinforcing ribs secured thereto and forming brackets, securing members for fastening said brackets to adjacent wall members, the side wall members having reinforcing ribs extending from adjacent the front towards the rear thereof and forming a track on which a circuit breaker is racked into and out of said wall, the side wall intermediate two adjacent walls acting as a common right and left wall for said adjacent cells and having said ribs symmetrically located on both surfaces thereof, said front wall comprising an operable panel making substantially the whole of said compartment accessible from the front.

JOSEPH D. WOOD.
GEORGE W. SPICER.

REFERENCES CITED

The following references are of record in the file of this patent:

UNITED STATES PATENTS

| Number | Name | Date |
|---|---|---|
| 1,885,365 | MacNeil | Nov. 1, 1932 |
| 1,966,218 | Powers | July 10, 1934 |
| 2,041,112 | Bucher | May 19, 1936 |
| 2,077,160 | Wilson | Apr. 13, 1937 |
| 2,121,610 | Rugg | June 21, 1938 |
| 2,164,660 | Miller | July 4, 1939 |
| 2,269,617 | Borstel | Jan. 13, 1942 |
| 2,319,415 | Lightfoot | May 18, 1943 |
| 2,345,033 | Claybourn | Mar. 28, 1944 |
| 2,359,247 | Rowe | Sept. 26, 1944 |
| 2,363,364 | Ruggs | Nov. 21, 1944 |
| 2,394,060 | Holmes | Feb. 5, 1946 |